April 22, 1924.

J. L. CONNERS 1,491,336

DIRIGIBLE HEADLIGHT FOR AUTOS

Filed May 10, 1921   3 Sheets-Sheet 1

Inventor,
J. L. Conners
By C. A. Snow & Co.
Attorneys.

April 22, 1924.

J. L. CONNERS 1,491,336

DIRIGIBLE HEADLIGHT FOR AUTOS

Filed May 10, 1921  3 Sheets-Sheet 2

Inventor,
J. L. Conners
By C A Snow & Co.
Attorneys.

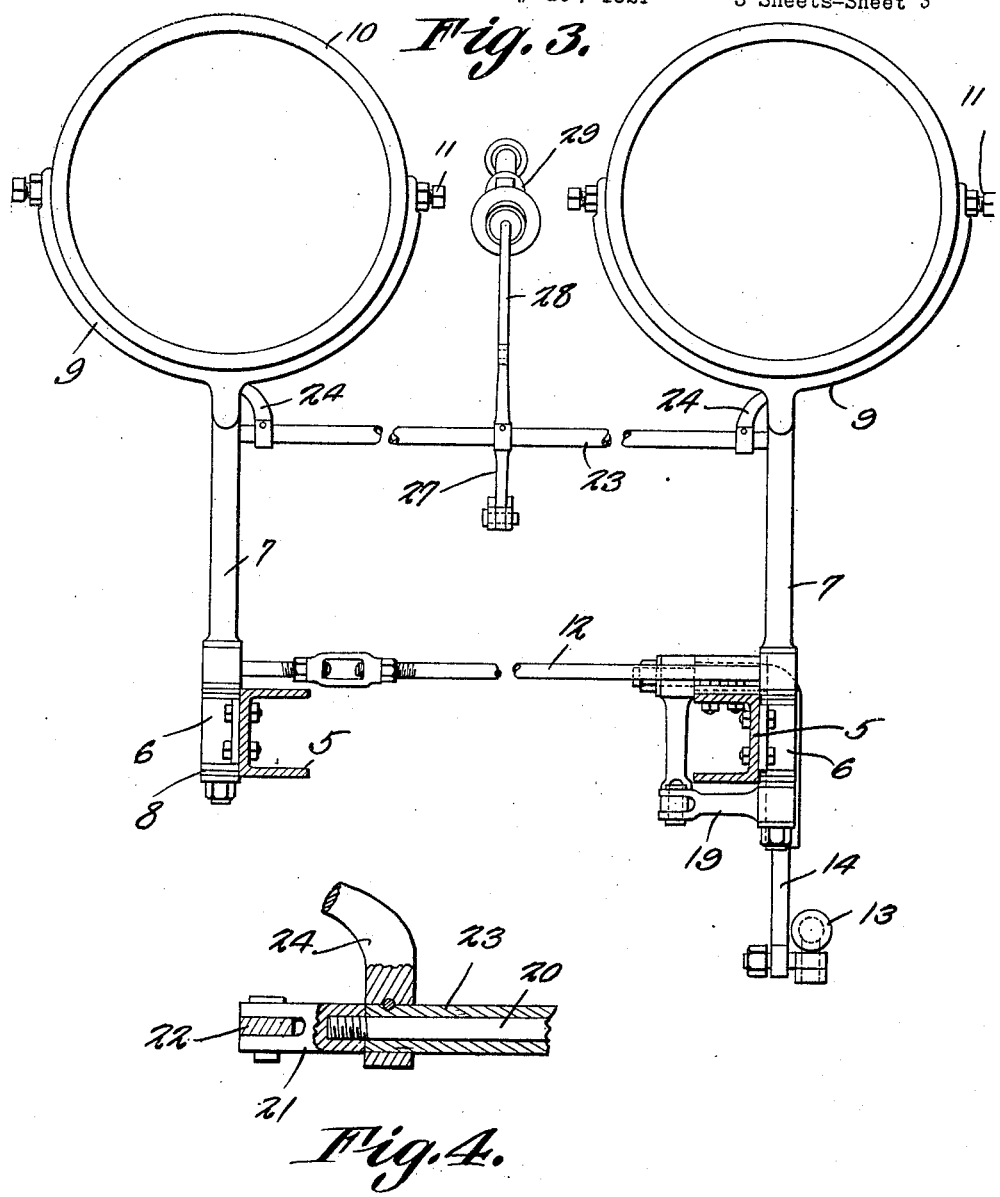

Patented Apr. 22, 1924.

1,491,336

UNITED STATES PATENT OFFICE.

JOHN LEO CONNERS, OF NEVADA, MISSOURI, ASSIGNOR TO CLAY TUCKER, OF NEVADA, MISSOURI.

DIRIGIBLE HEADLIGHT FOR AUTOS.

Application filed May 10, 1921. Serial No. 468,279.

*To all whom it may concern:*

Be it known that I, JOHN LEO CONNERS, a citizen of the United States, residing at Nevada, in the county of Vernon and State of Missouri, have invented a new and useful Dirigible Headlight for Autos, of which the following is a specification.

This invention relates to automobile headlights, and more particularly to headlights of the dirigible type, it being an object of the invention to provide headlights which will move automatically with the front wheels of a vehicle, to illuminate the path of travel of the vehicle supplied with the headlights.

A further object of the invention is to provide means for manually moving the lamps in a vertical plane to regulate the pitch of the light rays from the lamps, thereby eliminating any possibility of the lamps blinding the operator of an approaching machine.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 3 is a front elevational view of the lamps as applied.

Figure 4 is a sectional view taken on line 4—4 of Figure 2.

Figure 1:
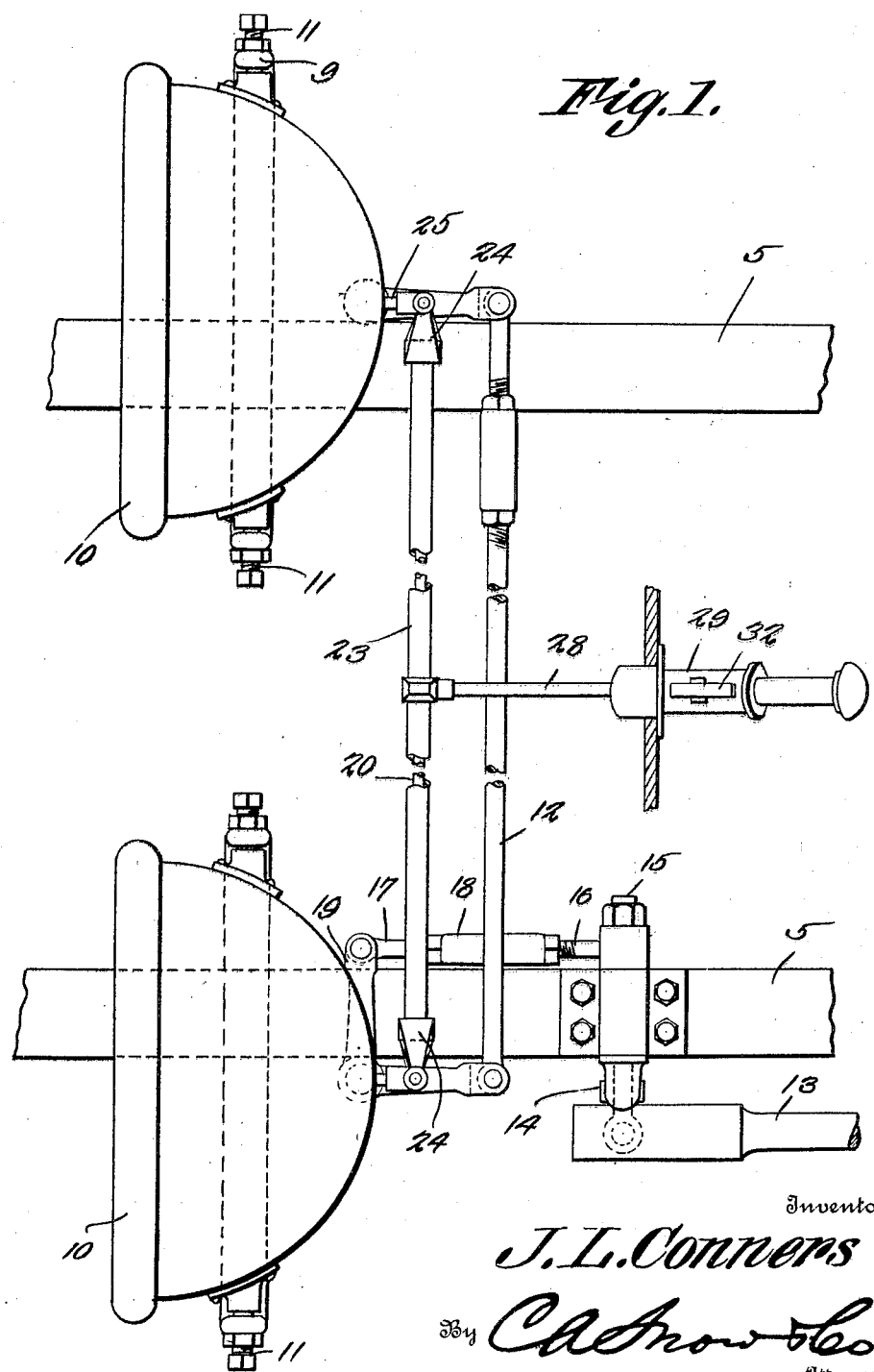
Figure 1 illustrates a plan view of the side rails of a motor vehicle, showing the lights constructed in accordance with the present invention, as applied.
Figure 2:
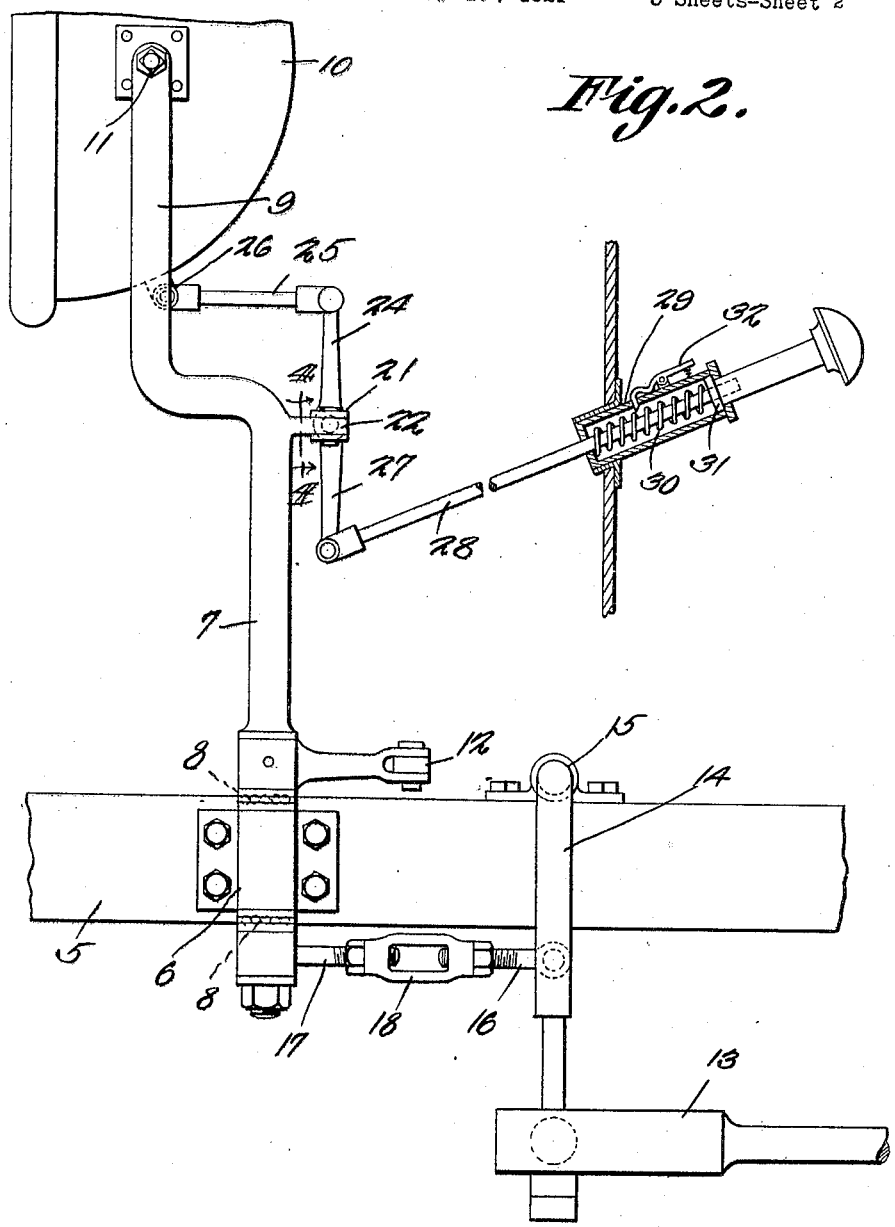
Figure 2 is a side elevational view of one of the lamps, illustrating the manner of supporting the same.

Referring to the drawings in detail, the reference character 5 designates side rails of the chassis of a motor vehicle, to which are secured the bracket members 6, which bracket members provide means for receiving the lower extremities of the lamp standards 7, which are secured within the bracket members and permitted to revolve therein.

Ball-bearings 8 are disposed between the lamp standard 7 and the bracket member 6, thereby permitting the lamp standards to revolve freely within their supports, and insuring the movement of the lamps under the slightest movement of their operating rods.

The upper extremity of each lamp standard 7 is forked as at 9 to provide brackets for the lamps 10, and as shown each of the brackets 9 is provided with openings to accommodate the pivot bolts 11, on which the lamp proper may pivot to adjust the same in a vertical plane.

The lamp standards are connected by the usual lamp connecting rod 12 which operates to move the lamps simultaneously in a horizontal plane to accomplish the purpose of the invention. An operating rod 13 has connection with a depending arm 14 which is pivotally supported by one of the side rails 5, as at 15, and this arm has connection with the rod 16 which is connected to the rod 17 by means of the adjustable turn-buckle 18, so that lost motion of the arm 14 may be readily compensated for.

This rod 17 has connection with one of the lamp standards, as through the arm 19, whereby movement of the arm in one direction results in a relative movement of the lamp associated therewith, and a simultaneous movement of the opposite lamp, which has connection through the rod 12.

In order that the lamps may be tilted in a vertical plane, a supporting shaft 20 extends between the lamp standards, and has its ends threaded in the heads 21 that have pivotal connection with the lamp standards, as at 22. This shaft 20 supports a tubular shaft 23 that in turn carries the curved arms 24, the arms being secured to the tubular shaft 23 to rotate therewith to accomplish the tilting of the lamps which have connection with the curved arms 24 through the medium of the links 25 which have their forward ends pivotally connected to the ears 26 formed on the respective lamps 10.

Disposed substantially centrally of the tubular shaft 23, is a depending arm 27 that has connection with the operating rod 28, formed of flexible material, and designed to control the arm 27 for tilting the lamps. The rod 28 extends through the dash-board of the vehicle, to which the device is applied, and has a portion thereof embraced by the tubular housing 29, the housing 29 enclosing the coiled spring 30 which has one end thereof abutting one end of the housing, while the opposite end thereof engages the washer 31, so that movement of the rod will compress the spring 30 and cause the spring to urge the rod to its normal position, when the rod 28 has been released, there being provided however a latch member 32 having one end thereof operating within the housing 29, and designed to engage the washer 31 to support the rod 28 in an adjusted position.

Having thus described the invention, what is claimed as new is:—

In a device of the character described, lamp standards supported to operate in horizontal planes, said lamp standards having forked upper ends, lamps pivotally supported within the forks and adapted to move in vertical planes, arms extending rearwardly from the lamp standards, a connecting rod having its ends pivotally connected to the rearwardly extended arms, a tubular shaft housing the connecting rod, curved arms mounted on the tubular shaft, connecting links connecting the curved arms and lamps, an arm secured to the tubular shaft at a point intermediate the ends thereof, said arm extending downwardly, an operating rod having pivotal connection with the downwardly extended arm, to move the tubular shaft and curved arms, to tilt the lamps, and means for moving the lamp standards in horizontal planes.

In testimony that I claim the foregoing as my own, I have hereto affixed my signature in the presence of two witnesses.

JOHN LEO CONNERS.

Witnesses:
CLAY TUCKER,
E. MADDOX.